United States Patent [11] 3,581,561

[72] Inventors James R. Tomashek
Wood Dale;
Donald H. Ward, Glen Ellyn, both of, Ill.
[21] Appl. No. 869,631
[22] Filed Oct. 27, 1969
[45] Patented June 1, 1971
[73] Assignee Borg-Warner Corporation
Chicago, Ill.

[54] ENGINE ACCELERATION HORSEPOWER-METERING SYSTEM
9 Claims, 5 Drawing Figs.
[52] U.S. Cl........................................ 73/117.2,
73/517, 324/70
[51] Int. Cl...................................... G01m 15/00
[50] Field of Search............................. 73/116;
324/70 (A); 235/151.32

[56] References Cited
UNITED STATES PATENTS
3,331,200  7/1967  Byron et al................ 73/116UX
3,469,662  9/1969  Dewar....................... 324/70X Primary Examiner—Jerry W. Myracle
Attorneys—Donald W. Banner, William S. McCurry and John W. Butcher ABSTRACT: A magnetic pickup senses rotation of the engine ring gear to provide a frequency-related signal which is translated into a speed-related voltage signal. This voltage signal passes a first speed level $w_1$ at the commencement of a predetermined time period $\Delta t$, established by a multivibrator circuit. At the end of the time period $\Delta t$ a second speed level signal $w_2$ is provided. The engine horsepower is then determined by the expression $$HP = \frac{(w_2)^2 - (w_1)^2}{\Delta t} \cdot \frac{J}{k}$$

where $J$ represents the motor inertia and $k$ is a constant, to provide a value indicative of the engine acceleration horsepower.

PATENTED JUN 1 1971　3,581,561
SHEET 1 OF 4
FIG. 1
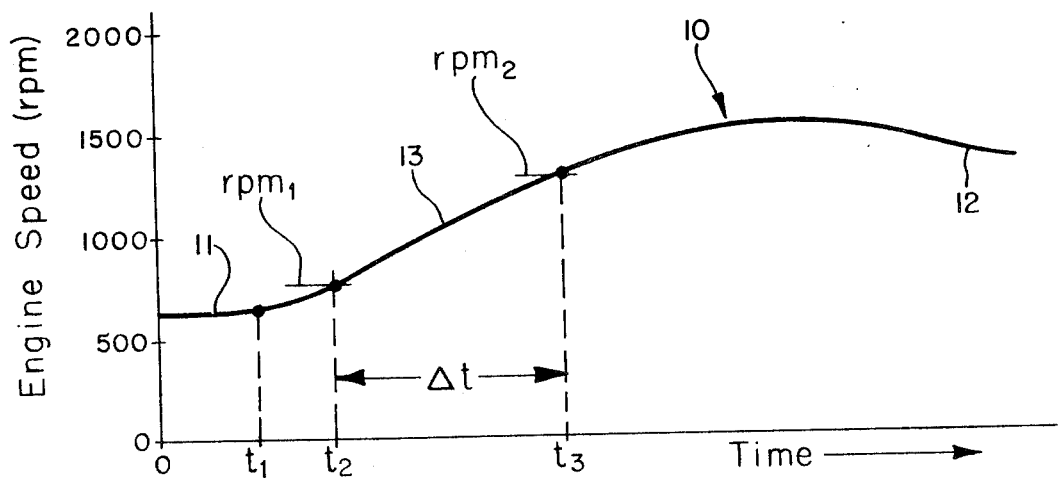
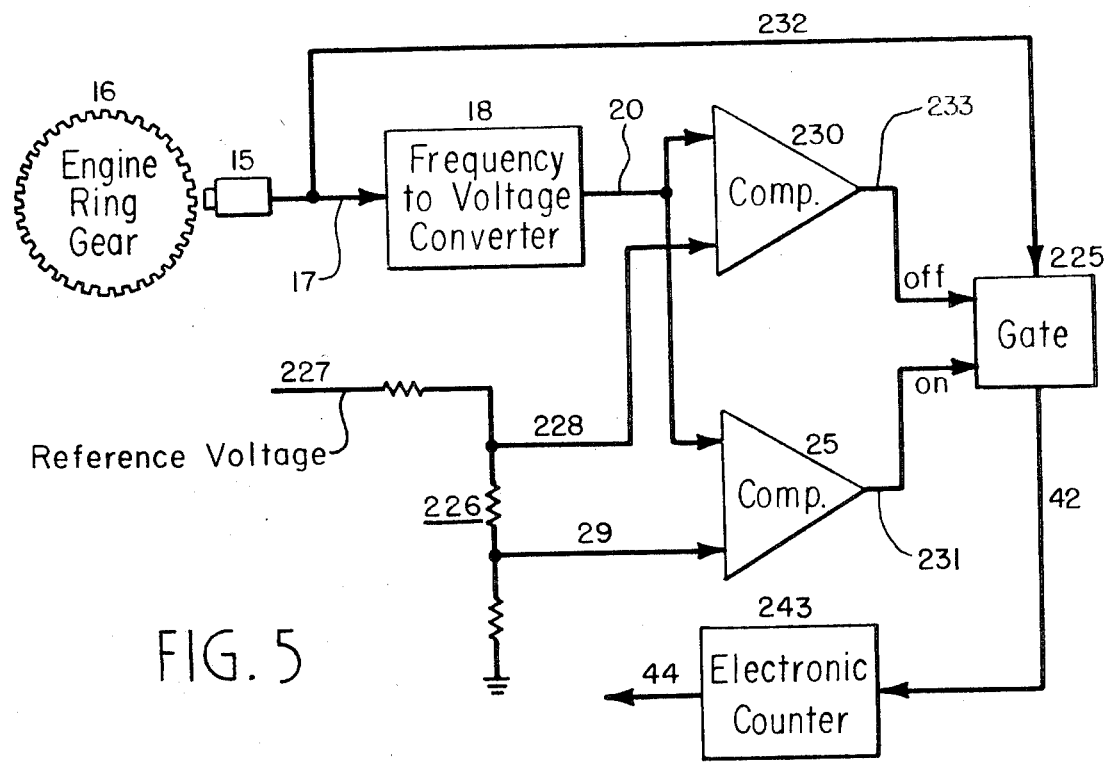
FIG. 5
Inventors
James R. Tomashek
Donald H. Ward
By James J. Jennings, Jr.
　　Attorney

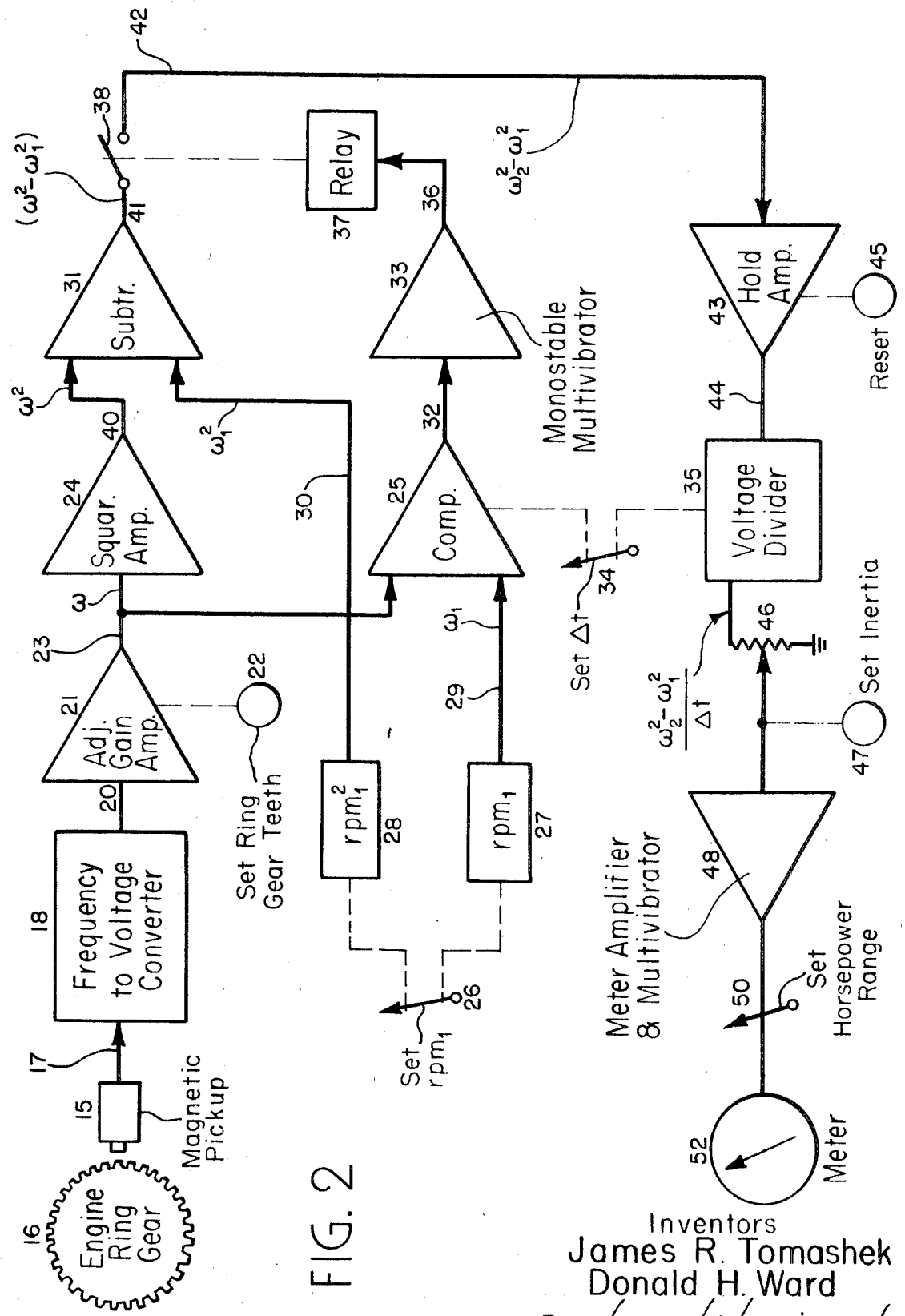

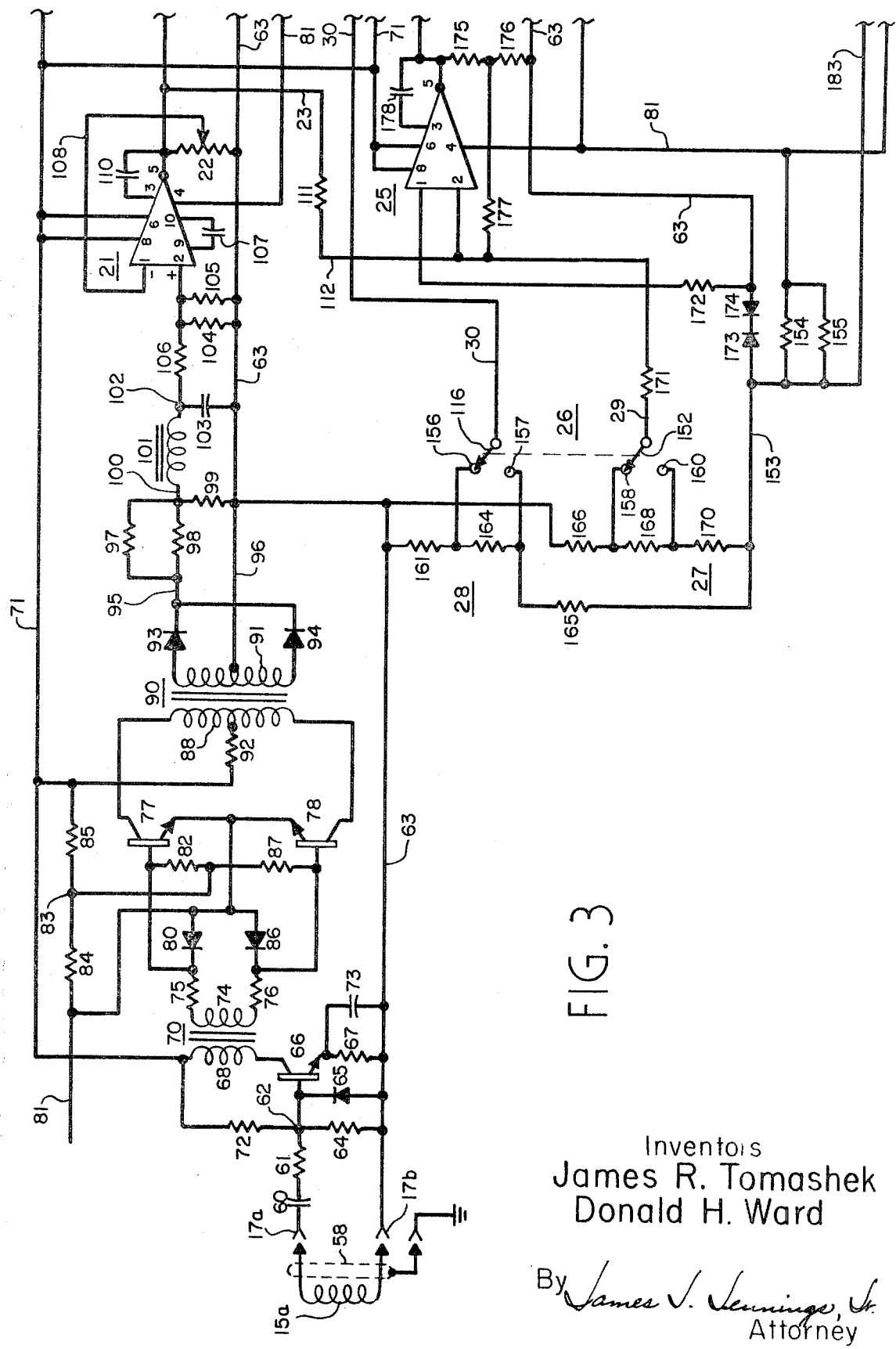

ENGINE ACCELERATION HORSEPOWER-METERING SYSTEM

BACKGROUND OF THE INVENTION

Various techniques have been evolved to provide some indication of the horsepower of an engine, both to afford a comparison with other engines and to establish a reference against which the same engine can be compared over its operating life. Frequently an external dynamometer or absorber is coupled to the engine. This provides a good indication of the brake horsepower developed at a fixed speed, but it is cumbersome and time consuming to disconnect an engine from its drive train and hook it to a dynamometer to obtain the horsepower indication.

It is therefore a primary consideration of the present invention to provide a metering system for obtaining a horsepower indication of an engine under test without the necessity of coupling the engine to a dynamometer or similar known horsepower-measuring arrangement.

It is a corollary consideration of the present invention to provide such an improved horsepower-measuring arrangement which affords convenient and swift measurement of the engine horsepower in the field, to provide a basis for comparison with previous operating performance of that same engine, or with performance standards established for that model engine.

SUMMARY OF THE INVENTION

The present invention is useful in measuring engine acceleration horsepower $HP$ as an engine under test, and having an inertia $J$, is accelerated from a first speed $w_1$ to a second speed $w_2$ over a time period $\Delta t$ according to the expression $$HP = \frac{(w_2)^2 - (w_1)^2}{\Delta t} \cdot \frac{J}{k}$$

where $k$ is a constant. The inventive $HP$ comprises the steps of providing preset values for two $J$, the three terms $\Delta t$, $rpm_1$, and $rpm_2$. The acceleration of the engine under test is then monitored from a first time at the beginning of $\Delta t$ to a second time at the expiration of $\Delta t$, to provide a value for the third one of the terms $\Delta t$, $rpm_1$, and $rpm_2$. Next an intermediate signal, which varies as a function of the expression $$\frac{(r.p.m._2)^2 - (r.p.m._1)^2}{\Delta t}$$

is provided. This intermediate signal is modified by a factor related to the inertia $J$ and the constant $k$ to provide an ultimate value representative of the acceleration horsepower of the engine under test.

THE DRAWINGS

In the several figures of the drawings like reference numerals identify like elements and in the drawings:

FIG. 1 is a graphical illustrating useful in understanding operation of the present invention;

FIG. 2 is a block diagram of a metering system intercoupled in accordance with the present invention;

FIGS. 3 and 4 are schematic diagrams which taken together give the details of the system shown more generally in FIG. 2; and FIG. 5 is a block diagram depicting another embodiment of the present invention.

GENERAL DESCRIPTION OF THE INVENTION

Figure 4:
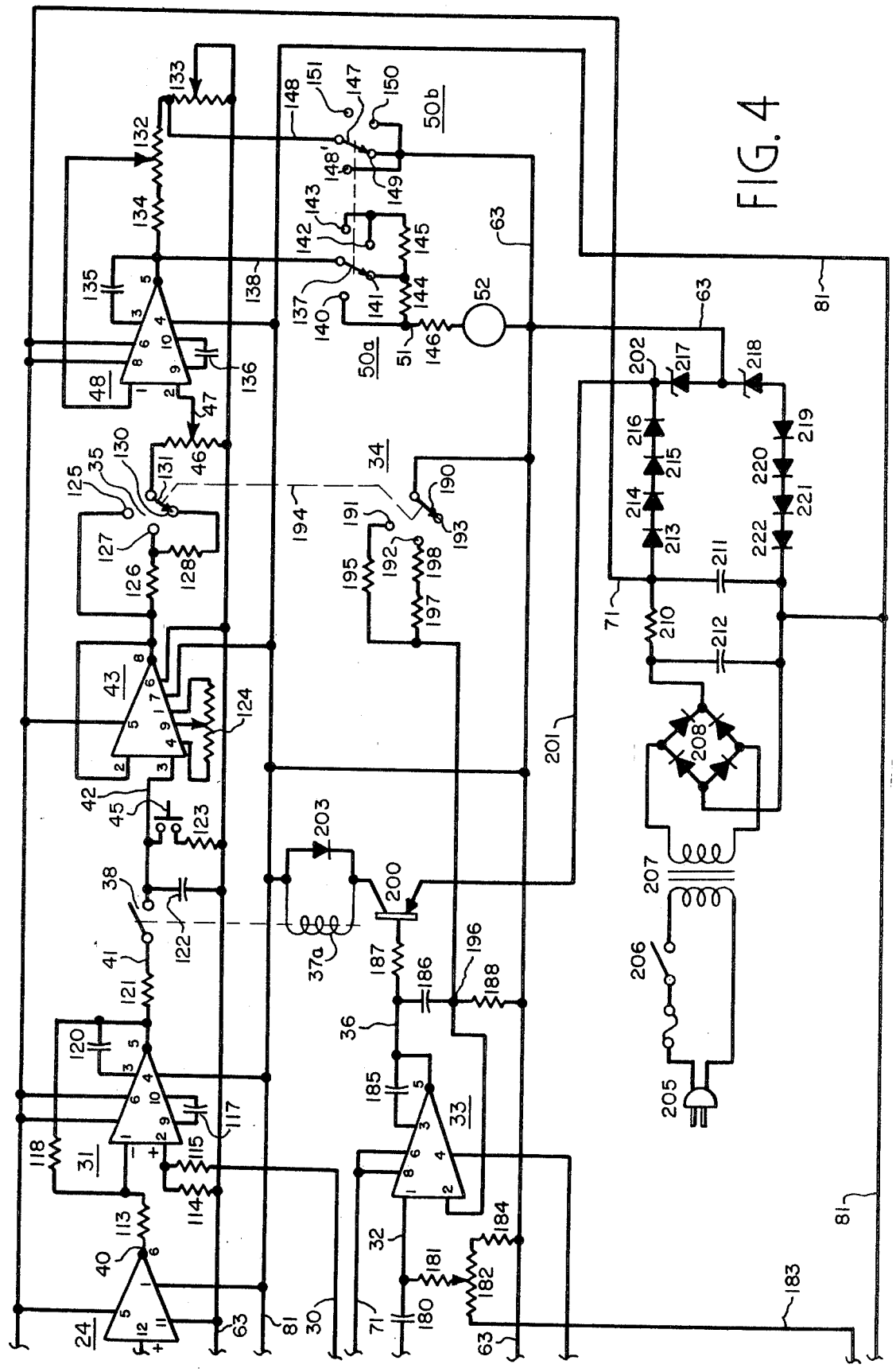

FIG. 1 illustrates a typical engine acceleration curve 10, depicting speed of a typical engine in revolutions per minute (r.p.m.) plotted as a function of time. When the engine is started, it initially operates at a low-idle level represented by the initial portion 11 of the curve. At a time represented as $t_1$ the throttle is advanced to the maximum position and the engine speed commences to increase toward the high-idle setting represented by the curve portion 12. This speed increase is approximately linear over the portion 13 of the curve as the engine accelerates toward the high-idle speed. To measure the acceleration horsepower, a first value $rpm_1$ is selected such that its value is above the low-idle speed, and thus above the portion where the curve changes slope in the transition from the low-idle portion 11 to the virtually linear portion 13.

As the speed setting $rpm_1$ is passed, a timing circuit is initiated at the time $t_2$ corresponding to the $rpm_1$ setting. The time $\Delta t$ is considered a preset value, even as $rpm_1$. Time $\Delta t$ extends from $t_2$ to $t_3$. At the end of the time $\Delta t$, or at time $t_3$, the metering system measures the speed to obtain the value $rpm_2$. This is done automatically at the expiration of the time period $\Delta t$. Thus with the values $rpm_1$, $rpm_2$ and the time $\Delta t$, all the information required for automatic computation of the average engine acceleration is present. More specifically, the average engine acceleration is determined by:

$$\text{Average acceleration} = \frac{r.p.m._2 - r.p.m._1}{\Delta t}$$

In addition the average speed can be determined:

$$\text{Average speed} = \frac{r.p.m._2 + r.p.m._1}{2}$$

The torque, in inch-pounds, for accelerating the engine is related both to the average acceleration and to the inertia $J$:

$$\text{Torque} = \frac{r.p.m._2 - r.p.m._1}{\Delta t} \cdot \frac{2}{60} \cdot J$$

The horsepower required to accelerate the engine is a function of torque and average speed:

$$HP = \frac{\text{Torque} \cdot \text{average speed}}{63,030}$$

Thus the horsepower is given by $$HP = \frac{r.p.m._2 - r.p.m._1}{\Delta t} \cdot \frac{r.p.m._2 + r.p.m._1}{2} \cdot \frac{2}{60} \cdot \frac{J}{63,030}$$

or $$HP = \frac{(r.p.m._2)^2 - (r.p.m._1)^2}{\Delta t} \cdot \frac{J}{12.04 \cdot 10^5}$$

The only value of the last expression for horsepower given above not already determined is $J$, the inertia of the engine. The inertia value varies for the different engines and thus an adjustment, which in the preferred embodiment is a potentiometer, is provided so that a dial can be set for the particular inertia value $J$ of the engine under test. The value $12.04 \cdot 10^5$, a fixed value $k$, can also be readily accommodated in the system. In addition a meter is utilized to display the horsepower value.

It will become apparent hereinafter, especially in connection with FIG. 5, that in place of fixed values of $w_1$ and $\Delta t$, $w_1$ and $w_2$ can be the preset values. In this arrangement the time duration $\Delta t$ is determined by measuring the time required for the engine to accelerate from $w_1$ to $w_2$. Thus the required information is again available to determine the engine acceleration horsepower.

DETAILED DESCRIPTION OF THE INVENTION

As shown in FIG. 2, a magnetic pickup 15 is mounted by means of a suitable bracket (not illustrated) adjacent the engine ring gear 16. In practice, an access opening is provided to facilitate mounting of the pickup unit 15 in a position to provide electrical output pulse signals on line 17, which signals vary in time as a function of the angular displacement of the teeth on ring gear 16. These pulse signals are applied to the input circuit of a frequency-to-voltage converter 18, which functions to provide an output voltage on line 20 proportional to the engine r.p.m. This voltage is applied to the input side of an adjustable gain amplifier 21, and an adjustment means 22 is provided to compensate the circuit of amplifier 21 for the particular number of gear teeth on the ring gear 16 of the engine under test. Thus the output signal on line 23 is a voltage, proportional to engine speed or r.p.m., modified in accordance with the setting of adjusting unit 22 which allows for different numbers of ring gear teeth.

This speed-representing signal on line 23 is applied to the input side of a squaring amplifier 24, and to one input connection of a comparator stage 25. Another adjustment means 26 is provided to allow the user of the system to select the value of $rpm_1$, that is, the speed above the low-idle speed at which the time period $\Delta t$ commences. Adjustment of unit 26 establishes a fixed value of voltage corresponding to $rpm_1$ in stage 27, and likewise provides a fixed value at the output side of another stage 28, which effectively squares the value of $rpm_1$. This signal $(rpm_1)^2$ is passed over line 30 to one input connection of a subtractor stage 31.

Comparator stage 25 upon recognizing equality between the increasing value of the engine speed voltage provided over conductor 23 and the preset value of $rpm_1$ received from stage 27 over line 29, provides an output signal on line 32 which changes the state of a monostable multivibrator stage 33. This occurs at time $t^2$ as shown in FIG. 1 to initiate period $\Delta t$ as the motor speed increases along the substantially linear portion 13 of the acceleration curve. The time interval $\Delta t$ is established by another reference means 34, which modifies the timing circuit in the multivibrator stage 33, and also modifies circuit constants in the circuit of a voltage divider stage 35. In its change of state monostable multivibrator 33 passes an output signal over line 36 to actuate a relay 37 and close contact set 38. Multivibrator stage 33, together with relay 37 and its contact set 38, all function as a gate to pass a signal appearing on line 41 to line 42 during the period $\Delta t$.

Subtractor stage 31 receives a first signal, to the square of the $rpm_1$ value provided by stage 28, over line 30. In addition, over line 40, subtractor stage 31 receives another signal related to the square of the instantaneous value $w$ of the engine r.p.m. The circuitry within stage 31 continually subtracts the value of the signal received over line 30 from that received over line 40, to provide an output signal on line 41 which varies as $(rpm)^2-(rpm_1)^2$. At the time $t^3$ (FIG. 1), the output pulse from the multivibrator on line 36 is discontinued and relay 37 deenergizes, opening contact set 38. Upon the opening of this contact set the value of the instantaneous motor speed is that referenced $rpm_2$ in FIG. 1. Accordingly the level of the signal on conductor 42 when contact set 38 opens is equal to $(rpm_2)^2-(rpm_1)^2$.

The signal on line 42 is applied to the input side of a holding amplifier stage 43, which maintains an output signal on line 44 related to the level of the signal on line 42 when contact set 38 is opened. This holding amplifier circuit operates in a well-known manner and can maintain the signal level for an extended time, for a period of several hours, thus allowing inspection and recording of the signal obtained during rapid acceleration of the engine under test. A reset button 45 is provided to remove the output signal from output line 44 and condition the holding amplifier stage 43 for receipt of another signal over conductor 42.

The output signal on line 44 is modified appropriately by the voltage divider 35 so as to effect the division by $\Delta t$. The constants of this divider are set by control 34 so that for a particular value of $\Delta t$ of the monostable multivibrator, 33, the correct division ratio of 35 is used.

Another adjustment means, shown as a potentiometer 46, is provided between the output side of voltage divider stage 35 and meter amplifier and multiplier stage 48, to afford the setting of the inertia value $J$ for the particular engine under test. Thus the signal from stage 48 represents the horsepower of the engine, and this signal is passed to a horsepower range switch 50, which is adjustable to set the horsepower range to accommodate the engine under test. The output signal from horsepower range switch 50 is passed to meter 52 for visual display on the face of the meter to give a direct indication of the engine horsepower over the acceleration range, which indication is maintained until reset button 45 is actuated. With this general perspective of the system a more detailed explanation will now be set out in connection with FIGS. 3 and 4.

Commencing at the left side of FIG. 3, winding 15a is the pickup portion of the unit 15 shown more generally in FIG. 2. As the teeth of the ring gear 16 pass adjacent winding 15a, pulse signals at a frequency corresponding to the angular rotation of the engine ring gear are provided over conductors 17a, 17b. The symbol referenced 58 denotes shielding of the leads to the pickup head at the extremity of the pickup unit adjacent the ring gear.

Conductor 17a is coupled over a capacitor 60 and a resistor 61 to a common connection 62, and conductor 17b is coupled to a common conductor 63, generally termed a ground conductor. This latter conductor represents a plane of reference potential against which the other energizing voltages can be compared. A resistor 64 is coupled between terminal 62 and conductor 63, and a diode 65 is coupled in parallel with resistor 64. An NPN-type transistor 66 has its base connected to terminal 62, its emitter coupled through a resistor 67 to conductor 63, and its collector coupled through primary winding 68 of a transformer 70 to positive energizing conductor 71. A resistor 72 is coupled to conductor 62, to provide bias to the base of transistor 66. Capacitor 73 is coupled in parallel with the emitter resistor 67.

Transformer 70 has a secondary winding 74, the opposite ends of which are respectively coupled through a pair of resistors 75, 76 to the bases of a pair of NPN-type transistors 77, 78, the emitters of which are coupled together. The base of transistor 77 is also coupled through a diode 80 to the negative energizing conductor 81, and this base is also coupled through a resistor 82 to the common connection 83 in a voltage divider circuit comprised of resistors 84, 85 coupled between negative energizing conductor 81 and positive energizing conductor 71. Likewise the base of transistor 78 is coupled through a diode 86 to negative conductor 81, and through a resistor 87 to connection 83 in the voltage divider circuit 84, 85.

The collectors of transistors 77, 78 are respectively coupled to the opposite ends of primary winding 88 of a transformer 90 which also includes a secondary winding 91. Resistor 92 is coupled between positive energizing conductor 71 and the center tap connection of primary winding 88. A pair of diodes 93, 94 are coupled as shown to opposite ends of secondary winding 91, and the anodes of these two diodes are both connected to conductor 95. The center tap connection of secondary winding 91 is coupled to another conductor 96. Transformer 90 has a square saturation characteristic to assist in squaring the pulse signals passed from winding 15a through transistor 66, transformer 70, and transistor pair 77, 78 to the primary winding 88 of transformer 90. This transformer, with diodes 93 and 94, operates as the frequency-to-voltage converter 18, to provide a voltage signal related to the instantaneous engine speed.

A temperature-compensating network comprising resistors 97, 98 and 99 is coupled as shown to compensate the squared pulse signal for temperature variations. Resistors 97 and 98 are coupled in parallel between conductors 95 and 100, and resistor 99 is coupled between conductors 100 and 63. A filter is provided to smooth the speed-indicating voltage signal. The filter includes a choke or inductor 101 coupled between conductors 100 and 102, and a capacitor 103 coupled between conductors 102 and 63. Thus the signal between conductors 102 and 63 is a voltage signal which is a function of the angular rotation of the engine ring gear, or that signal represented as being translated over line 20 in FIG. 2.

The adjustable gain amplifier stage 21 includes an operational amplifier having the terminals referenced to assist those skilled in the art to practice the invention with a minimum of experimentation. Resistors 104, 105 are coupled in parallel between input terminal 2 and conductor 63, and another resistor 106 is coupled between this input terminal and conductor 102. Capacitor 107 is connected between terminals 9 and 10 for stability purposes. A gain-adjust or negative feedback circuit includes conductor 108, coupled between input terminal 1 of the op amp and the movable tap of potentiometer 22, one end of which is coupled to conductor 63. The other end of potentiometer 22 is coupled both to terminal 5 of the op amp and, through a capacitor 110, to terminal 3. Terminals 8 and 6 are both coupled to positive energizing conductor 71, and terminal 4 is coupled to negative energizing conductor 81. The setting of potentiometer 22 is adjusted to vary the gain of the entire stage 21 in a manner which effectively compensates for the different numbers of teeth on different engine ring gears.

The output signal from adjustable gain amplifier 21 is passed over conductor 23, both to input terminal 12 of the squaring amplifier 24, and through a resistor 111 and conductor 112 to the + terminal 2 of the comparator stage 25. Squaring amplifier 24, which is a modular unit, has its number 5 terminal connected to positive energizing conductor 71, its 11 terminal connected to reference conductor 63, and its 1 terminal coupled to negative energizing conductor 81. The number 6 terminal of this module, connected as the output terminal, is coupled through conductor 40 and resistor 113 to the 1 input terminal of another op amp 31 connected as a differential amplifier or subtractor stage. The + or number 2 terminal of this op amp is coupled through a resistor 114 to ground conductor 63, and the same terminal is also coupled over a resistor 115 and conductor 30 to movable contact 116 of the "set $rpm_1$" switch 26. In the illustrated embodiment this switch is a two-position adjusting means but of course any number of positions and increments of adjustment can be provided.

In subtractor stage 31 a capacitor 117 is coupled between terminals 9 and 10, and a resistor 118 is coupled between terminals 1 and 5 in a feedback connection. Terminal 4 of this op amp is coupled to negative energizing conductor 81, and terminal 3 is coupled through a capacitor 120 to output terminal 5. Terminals 8 and 6 are coupled to positive energizing conductor 71. A resistor 121 is coupled between output terminal 5 of stage 31 and the contact set 38 of relay 37, which includes a winding 37a to be described subsequently.

The other side of the contact set 38 is coupled over conductor 42 to input terminal 3 of holding amplifier stage 43. A capacitor 122 is coupled between conductor 42 and ground conductor 63, to charge to a level represented by the increasing signal level on conductor 42 during operation of the metering system. A series circuit comprising reset switch 45 and a resistor 123 is coupled in parallel with capacitor 122 to afford rapid discharge of this capacitor and prepare the system for another cycle of operation. In the op amp circuit of the holding amplifier stage, terminal 5 is coupled to positive energizing conductor 71, terminal 6 is coupled to ground conductor 63, and terminal 7 is coupled to negative energizing conductor 81. Terminals 4 and 1 are coupled to opposite ends of an offset adjustment potentiometer 124, the movable tap of which is coupled to terminal 9. This potentiometer provides an adjustment of the output signal provided at terminal 8 so that this signal level can be set at precisely zero with no signal level present at input terminal 3. Output terminal 8 is coupled to negative input terminal 2, is also coupled directly to one fixed terminal 125 of voltage divider 35, and is also coupled through a resistor 126 to another fixed terminal 127 of the voltage divider. Terminal 127 is coupled through a fixed resistor 128 to the last terminal 130 in voltage divider 35, and the movable contact 31 is coupled to the top portion of an inertia set potentiometer 46, the other end of which is coupled to ground conductor 63.

The movable arm of inertia set potentiometer 46 is coupled over conductor 47 to input terminal 2 of the op amp in the meter amplifier and multiplier stage 48. The other input terminal 1 of this stage is coupled to the movable arm of a potentiometer 132 in the $k$ multiplier arrangement, which potentiometer is coupled in series with another potentiometer 133 which has its movable tap and one end portion connected directly to ground conductor 63. The settings of these two potentiometers are varied to accommodate different values of the actual circuit components, to produce the constant $k$ represented as the value $12.04 \times 10^5$ in the expression for engine horsepower developed above. Output terminal 5 of op amp 48 is coupled through a resistor 134 to an end of potentiometer 132. Terminal 9 is coupled through a capacitor 136 to terminal 10. Both terminals 8 and 6 are coupled to positive energizing conductor 71, and terminal 4 is coupled to negative energizing conductor 81.

Horsepower range switch 50 includes two switch gangs represented 50a and 50b in the schematic illustration. The portion 50a includes a movable contact 137 coupled over conductor 138 to output terminal 5 of op amp 48. Four fixed contacts 140, 141, 142 and 143 are provided for engagement with the movable contact 137. A resistor 144 is coupled between contacts 140 and 141, and another resistor 145 is coupled between contacts 141 and 142. Contacts 142 and 143 are connected directly together. Contact 140 is coupled over conductor 51 and a metering resistor 146 to the movement of meter 52, the other side of which is coupled to ground conductor 63. In the switch portion 50b, movable contact 147 is coupled over conductor 148 to the common connection between potentiometers 132, 133. Four fixed contacts 148', 149, 150 and 151 are provided for selective engagement by the movable contact 147, which is ganged to movable contact 137 in the horsepower range switch 50. Contacts 148', 149 and 150 are all connected together and to common conductor 63. Contact 151 is left blank.

The "set $rpm_1$" switch represented by numeral 26 in FIG. 2 is actually a ganged switch with a pair of movable contacts 116 and 152. These switch portions are depicted as blocks or stages 28 and 27 in FIG. 2 but those skilled in the art will appreciate from the showing of FIG. 3 that they are actually different portions of a complete voltage divider arrangement coupled between ground or reference conductor 63 and another conductor 153 which is coupled through a pair of parallel-connected resistors 154, 155 to negative energizing conductor 81. Movable contact 116 is shown engaging a fixed contact 156 and is displaceable to engage contact 157; movable contact 152 is shown engaging fixed contact 158, and is displaceable to engage contact 160. In the voltage divider circuit, resistor 161 is coupled between conductor 63 and terminal 156. A resistor 164 is coupled between fixed contacts 156 and 157. Another resistor 165 is coupled between contact 157 and conductor 153. A resistor 166 is coupled between conductor 63 and fixed contact 158. A resistor 168 is coupled between fixed contacts 158 and 160. A resistor 170 is shown coupled between fixed contact 160 and conductor 153. The potential at conductor 63 with the system operating is positive relative to the voltage applied to conductor 153, and because of the logic connections in comparator stage 25 and subtractor stage 31, the more positive voltages are "higher" in value. Thus the voltage level passed over movable contact 116 and conductor 30, depicting the square of the $rpm_1$ value, is always higher than the value of $rpm_1$ as passed over movable contact 152, conductor 29, resistor 171 and conductor 112 to input terminal 2 of comparator stage 25.

Comparator stage 25 has its 8 and 6 terminals coupled to positive energizing conductor 71, and its 4 terminal coupled to negative energizing conductor 81. The other input terminal 1 of this op amp is coupled through a resistor 172 to ground conductor 63. A pair of diodes 173, 174 are coupled in opposite senses as shown between conductors 63 and 153. A pair of resistors 175, 176 are coupled in series between output terminal 5 of this op amp and ground conductor 63. A resistor 177 completes a feedback path between input connection 2 and the common connection of resistors 175, 176. A capacitor 178 is coupled between terminals 3 and 5. A coupling capacitor 180 is coupled between output terminal 5 of the op amp 25 and conductor 32, for passing a signal to input terminal 1 of the monostable multivibrator op amp 33.

A resistor 181 is coupled between the movable arm of a potentiometer 182 and conductor 32, which conductor is also coupled to input terminal 1 of monostable multivibrator stage 33. One end of potentiometer 182 is coupled over conductor 183 to conductor 153, and the other end of potentiometer 182 is coupled over a resistor 184 to reference conductor 63. Displacement of the movable tap of potentiometer 182 affords a vernier adjustment of the time period $\Delta t$.

Terminals 8 and 6 of op amp 33 are coupled to positive energizing conductor 71, and terminal 4 is coupled to negative conductor 81. A capacitor 185 is coupled between terminals 3 and 5. Another capacitor 186 has one plate coupled to output terminal 5 and to one side of resistor 187, and the other plate of this capacitor is coupled to a terminal 196. Input terminal 2 of op amp 33 is also coupled to common terminal 196 and to resistor 188, and the other side of resistor 188 is coupled to ground.

The "select $\Delta t$" switch 34 includes a movable contact 190 and three fixed contacts 191, 192 and 193. Movable contact 190 is ganged, as represented by broken line 194, to the movable contact 131 in the voltage divider array 35 to effect a circuit change in that array concomitantly with any displacement of the movable contact 190 to change the effective circuit constants in the multivibrator circuit and thus correspondingly vary the time $\Delta t$. Specifically, a resistor 195 is coupled between terminals 191 and 196. A pair of resistors 197, 198 are coupled in series between fixed contact 192 and terminal 196. Contact 193 is left blank so that in the illustrated position of the select $\Delta t$ switch, the time $\Delta t$ is determined by the values of capacitor 186 and resistor 188. The effective value of the resistance coupled between capacitor 186 and ground conductor 63 is varied as movable contact 190, itself coupled to ground conductor 63, is displaced to engage either of contacts 191 or 192. With this displacement the $\Delta t$ can be readily varied.

Output terminal 5 of op amp 33 is coupled over conductor 36 and resistor 187 to the base of a PNP-type transistor 200, which has its emitter coupled over conductor 201 to a connection in the power supply circuit 202 to be described hereinafter. The collector of transistor 200 is coupled through winding 37a of relay 37 to negative energizing conductor 81, and a protective diode 203 is coupled in parallel with winding 37a. When comparator stage 25 "recognizes" that engine speed $w_1$ has been reached, it provides an output signal to the multivibrator stage 33 which in turn passes a negative-going output signal over line 36 and resistor 187 to the base of transistor 200, which is rapidly driven into saturation. Current then flows from a point in the positive portion of power supply 202 over conductor 201, the emitter-collector circuit of transistor 200, and through winding 37a to negative energizing conductor 81. Relay 37 operates and at its contact set 38 completes a circuit to pass a signal over conductor 42 to the holding amplifier state 43. The end of the period $\Delta t$, in the embodiment of the invention depicted in FIGS. 2, 3 and 4, is determined by the time constant of the circuit in the output side of op amp 33 which in turn depends upon the setting of switch 35. It is apparent that relay 37 effectively functions as a gate to pass a signal from conductor 41 to conductor 42 only during the time interval $\Delta t$ as determined by multivibrator stage 33 and the setting of select $\Delta t$ switch 34.

The power supply circuit 202 is a conventional arrangement including a three-prong plug 205 for connection to any conventional power main. Closure of switch 206 passes an AC energy over transformer 207 to rectifier bridge 208, providing a DC potential which is filtered in the circuit including resistor 210 and capacitors 211, 212. Accordingly at the output side of capacitor 211 a +15-volt potential (in this embodiment) was provided on conductor 71 relative to the common potential on conductor 63, and a −15-volt potential was applied on conductor 81 relative to the reference voltage on conductor 63. A string of diodes 213—222 is coupled in series between conductors 71 and 81, and conductor 63 is coupled to the common connection between Zener diodes 217, 218. Conductor 201 is coupled to the common connection between diodes 216 and 217.

At the end of the specification a tabulation of components and their values for the circuit shown in FIGS. 3 and 4 is set out, solely to assist those skilled in the art to make and use the invention, and in no sense by way of limitation. With the values there described and the metering system connected as shown in FIGS. 3 and 4, the horsepower range switch 50 is first placed in the 3,000-horsepower range, in which movable contacts 137, 147 engage fixed contacts 143, 151. The horsepower range switch should be left in this position until the instrument is warmed up and the other control adjustments properly positioned. In the horsepower range switch, contacts 142, 150 represent the 1,000-horsepower range; contacts 141, 149 depict the 300-horsepower range; and contacts 140, 148' denote the 100-horsepower range. Thus in the illustrated position of this switch the system is adjusted for operation in the 300-horsepower range.

Plug 205 is then inserted into a suitable receptacle and receives the usual 110—115 volts, 60-Hz., AC input energy. Turn-on switch 206 is closed and, as the instrument is warming up, the magnetic pickup 15 is positioned with winding 15a adjacent the ring gear access opening. In this embodiment an Electro Products 03030 magnetic pickup was utilized, nd the pickup unit should be placed no more than 0.050 inch from the ring gear teeth. The pickup unit is then coupled over conductors 17a, 17b to the horsepower system.

Potentiometer 22 in the output circuit of amplifier 21 is then adjusted in accordance with the number of gear teeth on the ring gear for the engine under test. The inertia value $J$ is also inserted by proper adjustment of the movable tap of potentiometer 46 in the input circuit of meter amplifier stage 48. The set $rpm_1$ switch 26 is also adjusted either to the position illustrated, corresponding to $w_1$ of 800r.p.m., or to the alternate position in which movable contacts 116, 152 engage fixed contacts 157, 160, which corresponds to a speed of 1,000 r.p.m. It is important that this adjustment be made to a setting which is definitely above low-idle speed of the engine under test, for reasons apparent from the foregoing explanation in connection with FIG. 1. The $\Delta t$ switch 34 is then adjusted to the desired time interval between $w_1$ and $w_2$. This switch is illustrated in the 1.0-second position and is displaceable such that contact 190 engages contact 192, providing a $\Delta t$ of 0.75 second, or such that contact 190 engages fixed contact 191, to set the $\Delta t$ period at 0.5 second. From the expression for measuring engine horsepower given above, it is apparent that a longer time interval will produce a better indication of the engine acceleration horsepower. Thus this switch should be adjusted to the maximum $\Delta t$ available, consistent with the requirement that the engine speed must not reach the curved portion of acceleration curve 10 above the $rpm_2$ setting before the end of the $\Delta t$ selected. When the system is warmed up for a period between 5 and 10 minutes and stabilized, testing the engine can begin.

FIG. 5 depicts another embodiment of the invention, in which the values $w_1$ and $w_2$ are preset, and thereafter the value of $\Delta i$ t is measured by the controlled operation of a gate circuit 225. A voltage divider circuit 226 is provided between conductor 227 and ground, to provide a first voltage value related to $w_1$ over conductor 29 to comparator stage 25, and a second voltage value related to $w_2$ over conductor 228 to comparator stage 230. As the engine is accelerated, the speed signal passed over conductor 20 to the upper input terminal of comparator stage 25 reaches the level $w_1$, and comparator stage 25 then passes a turn-on signal over conductor 231 to "open" gate circuit 225. Those skilled in the art will appreciate that the gate circuit can include a relay as shown in the other embodiment, or a switching unit such as a transistor, or any other conventional gate arrangement. At this time a speed-related series of pulses from magnetic pickup 15 is passed over conductor 232, through gate circuit 225 and over conductor 42 to electronic counter 243.

When the level of the speed-indicating signal on conductor 20 reaches $w_2$, a comparator stage 230 recognizes this condition and passes a turnoff signal over conductor 233 to switch off or open gate circuit 225, terminating the passage of the pulses to counter circuit 243. Accordingly the value of the third parameter $\Delta t$ is established from the readout on the counter 243. Horsepower is then computed, or determined from tables or a nomograph.

The circuit components and values for the circuit of FIGS. 3 and 4 are given below.

| | |
|---|---|
| 66, 77, 78 | 2N3417. |
| 21, 31, 48 25, 33 | Motorola MC-1433G. |
| 24 | Transmagnetics 752-CP2. |
| 43 | K & M Electronics KM-47C. |
| 200 | 2N3906. |
| 65 | 1N4004. |
| 80, 86, 174, 203, 213-216, 219-222 | 1N4001. |
| 173 | 1N4736. |
| 208 | 1N4002(4). |
| 217 | 1N2976B. |
| 218 | 1N2976B R. |

Capacitance values are in microfarads, unless indicated:

| | |
|---|---|
| 60 | 0.15. |
| 73 | 25.0. |
| 107, 117, 136 | 0.1. |
| 110, 120, 135, 178 | 5 picofarads. |
| 122 | 1.0. |
| 185 | 20 picofarads. |
| 186 | 2.0. |
| 211 | 2,000. |
| 212 | 300. |

Resistors are ½ wat, ± 10%, unless indicated:

| | |
|---|---|
| 22 | 10 k ohms. |
| 46 | 2 k ohms. |
| 61 | 39 k ohms. |
| 64, 75, 76, 162, 167 | 10 k ohms. |
| 67 | 2.2 k ohms. |
| 72 | 82 k ohms. |
| 82, 87, 172, 181 | 6.8 k ohms. |
| 84 | 2.7 k ohms. |
| 85, 111, 171 | 100 k ohms. |
| 104 | 18 k ohms. |
| 105 | 330 k ohms. |
| 106 | 12 k ohms. |
| 113, 114, 115, 118, 184 | 7.5 k ohms. |
| 121 | 270 ohms. |
| 123, 126, 128, 154, 155 | 1.0 k ohms. |
| 124 | 500 ohms. |
| 132 | 1 k ohm, ± 1%. |
| 133 | 5 k ohms, ± 1%. |
| 134 | 3.9 k ohms. |
| 144, 166 | 2.0 k ohms, ± 1%. |
| 145 | 6.98 k ohms, ± 1%. |
| 146, 170 | 976 ohms, ± 1%. |
| 161 | 84.5 ohms, ± 1%. |
| 163 | 56 k ohms. |
| 164, 168 | 523 ohms, ± 1%. |
| 165 | 2.2 k ohms, ± 1%. |
| 175, 177 | 270 k ohms. |
| 176 | 4.7 k ohms. |
| 182 | 5.0 k ohms. |
| 187 | 47 k ohms. |
| 188, 195 | 475 k ohms, ± 1%. |
| 197, 198 | 715 k ohms, ± 1%. |
| 210 | 150 ohms, 8 watts. |

While only particular embodiments of the invention have been shown and described, it will be apparent to those skilled in the art that various changes and modifications may be made therein without departing from he invention in its broader aspects. Therefore the aim in the appended claims is to cover all such changes and modifications as may fall within the true spirit and scope of the invention.

What we claim is:

1. The method of measuring engine horsepower $HP$ as an engine having an inertia $J$ is accelerated from a first speed $w_1$ to a second speed $w_2$ over a time period $\Delta t$ according to the expression $$HP = \frac{(w_2)^2 - (w_1)^2}{\Delta t} \cdot \frac{J}{k}$$

where $k$ is a constant, comprising the following steps:

providing preset values for two of the three terms $\Delta t$, $w_1$, and $w_2$; monitoring the acceleration of the engine under test from a first time at the beginning of $\Delta t$ to a second time at the expiration of $\Delta t$ to provide a valve for the third one of the terms $\Delta t$, $w_1$, and $w_2$;

providing an intermediate signal which varies as a function of the expression $$\frac{w_2^2 - w_1^2}{\Delta t}$$

and modifying the intermediate signal by a factor related to the inertia $J$ and the constant $k$ to provide an ultimate value representative of the acceleration horsepower of the engine under test.

2. The method of measuring engine horsepower as an engine is accelerated from a first speed $w_1$ to a second speed $w_2$ over a time period $\Delta t$, comprising the following steps:

deriving a frequency-related digital signal from the engine under test to provide a signal indicative of the first speed $w_1$ at the beginning of the time period $\Delta t$;

providing a second signal from the engine under test related to the speed $w_2$ at the end of the time $\Delta t$ squaring the first and second speed values $w_1$ and $w_2$;

subtracting the value of $w_1^2$ from the value of $w_2^2$ to obtain a difference value;

dividing the difference value by the value of $\Delta t$ to obtain a first resultant value;

multiplying the first resultant value by a constant related to the inertia of the engine under test to obtain a second resultant value related to the engine acceleration horsepower; and displaying the resultant horsepower value on a suitable indicator.

3. A system for measuring and indicating engine horsepower $HP$ as an engine having an inertia $J$ is accelerated from a first speed $w_1$ to a second speed $w_2$ over a time period $\Delta t$ corresponding to the expression $$HP = \frac{w_2^2 - w_1^2}{\Delta t} \cdot \frac{J}{k}$$

where $k$ is a constant, comprising:

an input circuit connected to provide a speed-indicating signal $w$ which varies in amplitude as a function of the engine speed;

circuit means for presetting the value of $w_1$, including means for providing a first output signal related to $w_1$ and a second output signal related to $w_1^2$;

a comparator circuit, connected to receive both the speed-indicating signal $w$ from the input circuit and the first output signal $w_1$, and to provide an output signal responsive to equality between the speed-indicating signal $w$ and the preset value of $w_1$;

a timing circuit, including circuit means connected to establish a preset time $\Delta t$ upon receipt of an input signal from said comparator circuit;

a squaring amplifier connected to continually square he speed-indicating signal $w$ and provide an output signal related to $w^2$; a subtractor stage connected to continually subtract the value $w_1^2$ from $w^2$;

a meter arrangement connected to display engine acceleration horsepower; and a gate circuit, connected to pass an output signal from the subtractor stage to the meter arrangement only during the time period $\Delta t$ as determined by the timing stage, thus establishing the value of $w_2$ as the instantaneous value of $w$ at the expiration of the preset time period $\Delta t$.

4. A measuring and indicating system as claimed in claim 3 in which said input circuit comprises a magnetic pickup unit positioned adjacent the ring gear of the engine under test to provide output pulses at a frequency related to engine ring gear rotation, and a frequency-to-voltage converter coupled to the magnetic pickup for providing the speed-indicating signal $w$.

5. A measuring and indicating system as claimed in claim 4 in which said input circuit further comprises an adjustable gain amplifier coupled to the output side of the frequency-to-voltage converter, and adjustment means for compensating the adjustable gain amplifier to provide an appropriate value of the speed-indicating signal $w$ in accordance with the number of teeth on the engine ring gear.

6. A measuring and indicating system as claimed in claim 3 in which the circuit means for presetting the value f i $w_1$ includes a voltage divider arrangement, with a first switch portion including a movable contact for providing the first output signal related to $w_1$, and a second switch portion including a second movable contact for providing the second output signal related to $w_1^2$.

7. A measuring and indicating system as claimed in claim 3 in which said timing circuit comprises a monostable multivibrator including an RC timing circuit for establishing the time period $\Delta t$, and switching means coupled to the RC timing circuit for selective adjustment to modify the effective RC time constant and correspondingly modify the time period $\Delta t$.

8. A measuring and indicating system as claimed in claim 3 in which said gate circuit comprises a relay having a winding connected for energization upon receipt of a signal during the time $\Delta t$ from said timing circuit, nd having a contact set coupled between said subtractor stage and the meter arrangement.

9. A system for measuring and indicating engine horsepower $HP$ as an engine having an inertia $J$ is accelerated from a first speed $w_1$ to a second speed $w_2$ over a time period $\Delta t$ corresponding to the expression $$HP = \frac{w_2^2 - w_1^2}{\Delta t} \cdot \frac{J}{k}$$

where $k$ is a constant, comprising:

an input circuit connected to provide a speed-indicating train of pulses;

a converter circuit, coupled to the input circuit, for providing a speed-indicating signal $w$ which varies in amplitude as a function of the engine speed;

circuit means connected to preset the values of $w_1$ and $w_2$;

a first comparator circuit, connected to receive both the speed-indicating signal $w$ from the converter circuit and the signal representing $w_1$, and to provide a turn-on signal responsive to equality between $w$ and $w_1$;

a gate circuit, connected to receive the train of speed-indicating pulses from the input circuit and, responsive to receipt of the turn-on signal from the first comparator stage, to pass the speed-indicating pulse train over its output circuit;

a second comparator circuit, connected to receive both the speed-indicating signal $w$ from the converter circuit and the signal representing $w_2$, and to provide a turnoff signal which is applied to said gate circuit responsive to equality between $w$ and $w_2$, to interrupt passage of the pulse train over the gate output circuit; and electronic counter circuit, connected to receive the speed-indicating pulses from the gate circuit, and to provide an output signal related to the acceleration horsepower of he engine under test.